Jan. 22, 1957  A. I. F. SIMPSON ET AL  2,778,229
DEVICES FOR TRANSMITTING ROTARY MOTION
Filed Oct. 29, 1954  2 Sheets-Sheet 1

INVENTORS
ARTHUR IAN FORBES SIMPSON
ARTHUR WARRINGTON
BY
ATTORNEY

Jan. 22, 1957 A. I. F. SIMPSON ET AL 2,778,229
DEVICES FOR TRANSMITTING ROTARY MOTION
Filed Oct. 29, 1954 2 Sheets-Sheet 2

INVENTORS
ARTHUR IAN FORBES SIMPSON
ARTHUR WARRINGTON

BY

ATTORNEY

United States Patent Office 2,778,229
Patented Jan. 22, 1957

2,778,229

DEVICES FOR TRANSMITTING ROTARY MOTION

Arthur Ian Forbes Simpson, Leamington Spa, and Arthur Warrington, Coventry, England, assignors to The General Electric Company Limited, London, England Application October 29, 1954, Serial No. 465,700

Claims priority, application Great Britain October 29, 1953

9 Claims. (Cl. 74—10.41)

The present invention relates to devices for transmitting rotary motion.

In the specification of United States patent application No. 422,639, there is described a device which comprises a driving shaft and a driven shaft that is adapted to be turned upon rotation of the driving shaft, the arrangement being such that the driven shaft may be positively located in any one of a plurality of positions although a certain amount of rotation of the driving shaft is possible even when the driven shaft is so located.

According to the present invention, a device for transmitting rotary motion comprises a driving shaft, a driven shaft which is co-axial with the driving shaft and which is required to be positively located in one or more positions, a first part which is coupled to the driven shaft so as to prevent rotation of that part relative to the driven shaft and which is shaped to have one or more indentations corresponding one to each of said positions, a ball which is spring-biased so that when the driven shaft is located in any one of said positions the ball is urged along a guide which is defined by a pair of opposite sides of the appropriate indentation of the first part and by a pair of fixed parts while the guide is tapered so that the ball then takes up a position in which it makes four point contacts one with each of the sides of the said pair thereof and with each of said fixed parts thereby locating the driven shaft, and a second part which is rigidly secured to the driving shaft or which is adapted to engage with the driving shaft, the arrangement being such that longitudinal movement of the driving shaft relative to the driven shaft causes a surface of the second part to bear against the ball and force it against the spring bias so as to release the first part while turning the driving shaft then causes the driven shaft to rotate due to coupling between the two parts.

The two shafts may be co-linear. Preferably the first and second parts are rigidly secured to the driving and driven shafts respectively. If, when the driven shaft is positively located, the ball makes point contact with a pair of rectilinear edges provided by the sides of an indentation of the first part and a pair of rectilinear edges provided by each of the pair of fixed parts, these two pairs of edges define the guide and either or both pairs may be inclined to one another in order to give the necessary taper to the guide. Alternatively the sides of an indentation and/or the fixed parts may each provide a surface with which the ball makes contact.

The two fixed parts may be provided by portions of a unitary body. For example these two parts may be formed by two portions bent out from a plate.

The two parts may each comprise a plate and the contour of the plate coupled to the driven shaft will then have the said indentations. The other plate may have a plurality of portions bent over, in each of said positions in which the driven shaft is positively located one of these portions providing the said surface that is arranged to bear against the ball. Preferably each of these portions extends through one of said indentations in the plate coupled to the driven shaft so as to provide the required coupling between the two parts.

One construction of a device in accordance with the present invention will now be described by way of example with reference to the four figures of the accompanying drawings in which—

Figure 1:
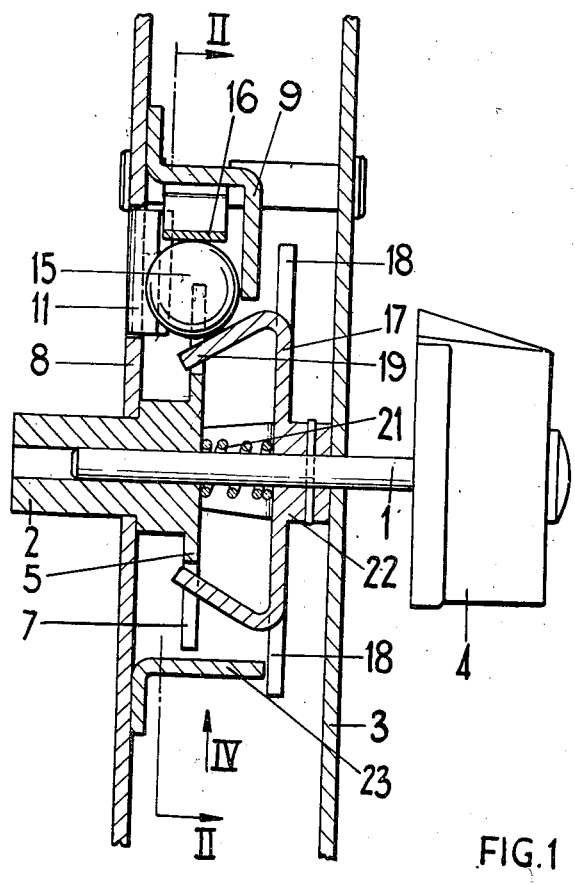
Figure 1 shows a side elevation of the device in cross-section.

The device to be described is for use in a radio receiver and forms part of the mechanism for switching from one band of frequencies to another. Referring now to the drawings, the device comprises a pair of shafts 1 and 2 which are mounted so that their axes are co-linear. The shaft 1, which will hereinafter be referred to as the driving shaft, passes through a front panel 3 of the radio receiver and is connected to a knob 4 which may be turned by an operator tuning the receiver. The other shaft 2, which will hereinafter be referred to as the driven shaft, is connected, possibly through a universal coupling (not shown), to a rotary switch (also not shown) which is arranged to effect switching from one frequency band to another. For this purpose it is required that the driven shaft shall be capable of being accurately located in any one of four predetermined positions, these positions being spaced 90° apart. The driven shaft 2, or at least the end thereof nearer to the front panel 3, is hollow and the driving shaft 1 is a sliding fit in the driven shaft.

The driven shaft 2 is mounted so that no longitudinal movement thereof is possible and a circular plate 5 is secured to the end of this shaft so as to lie perpendicular to the axis about which the two shafts 1 and 2 may turn. The plate 5 may, as shown, be integral with the shaft 2. This plate has four indentations 6 which are equally spaced round its perimeter. The two sides 7 of these indentations 6 are inclined to one another and may be provided with a 45° chamfer.

The driven shaft 2 passes through a fixed plate 8 and a Z-shaped member 9 is secured to this plate 8. Opposite this member 9 two portions 11 and 12 of the plate 9 are pressed out towards the member 9 so as to provide a pair of planar end surfaces 13 and 14, the adjacent edges of these surfaces being parallel to one another. A metal ball 15 is held captive between the member 9 and the end surfaces 13 and 14 of the portions 11 and 12. A leaf spring 16 urges this ball 15 towards the driven shaft 2 so that the ball 15 makes contact with the plate 5 when the driven shaft 2 is correctly located.

In fact when the driven shaft 2 is located in one of its pre-determined positions, the ball 15 is forced by the spring bias into the guide which is defined by the two end surfaces 13 and 14 and the sides 7 of one of the indentations 6 in the plate 5. Since the sides of the indentations 6 are inclined to one another, this guide is tapered so that the movement of the ball 15 into the guide is limited, and it will be realised, therefore, that when the driven shaft 2 is correctly located the ball 15 makes point contact with each of the surfaces 13 and 14 and the sides 7 of an indentation 6. The driven shaft 2 is thus accurately located and cannot be moved from that position merely by applying a torque to that shaft.

In an alternative arrangement, instead of the end surfaces 13 and 14 being provided for the ball 15 to bear against, there may be a channel shaped member that is secured to the plate 8 so that the channel faces the member 9 and the line of the channel points towards the driven shaft 2, the ball 15 making contact with the pair of rectilinear edges provided by the channel.

Another plate 17 is rigidly secured to the driving shaft 1 and this plate 17 has eight projections 18 and 19 spaced round its circumference. The alternate projections 19 are bent over through an angle of approximately 120°. This plate 17 is urged away from the plate 5 by means of a helical spring 21 although the actual movement of the plate 17 is limited by a collar 22 which is integral with the plate 17 and which is forced against the front panel 3. When in this position one of the bent-over projections 19 of the plate 17 lies close to the ball 15 but not touching it. Each of the bent-over projections 19 of the plate 17 passes through one of the indentations 6 in the plate 5 so as to provide little if any play between the plates 5 and 17.

In order to turn the driven shaft 2 the operator pushes the knob 4 towards the front panel 3 with the result that one of the bent-over projections 19 of the plate 17 bears against the ball 15 and forces it away from the driven shaft 2 against the bias of the leaf spring 16. This releases the plate 5 so that the shaft 2 can be rotated by the operator turning the knob 4.

Figure 4:
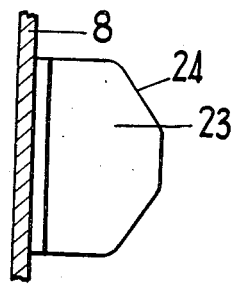
Figure 4 shows the shape of a part of the device seen in the direction of the arrow IV in Figure 1.
Figure 2:
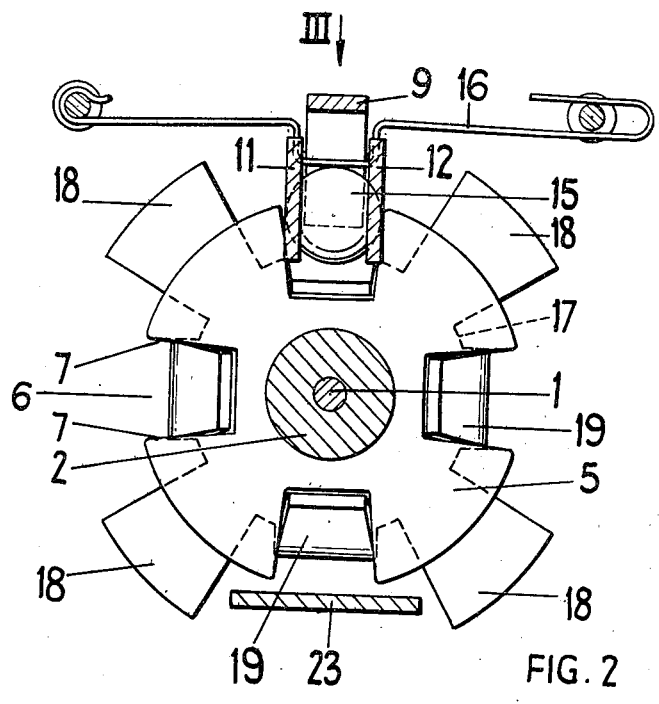
Figure 2 shows a cross-section at the line II—II in Figure 1.
Figure 3:
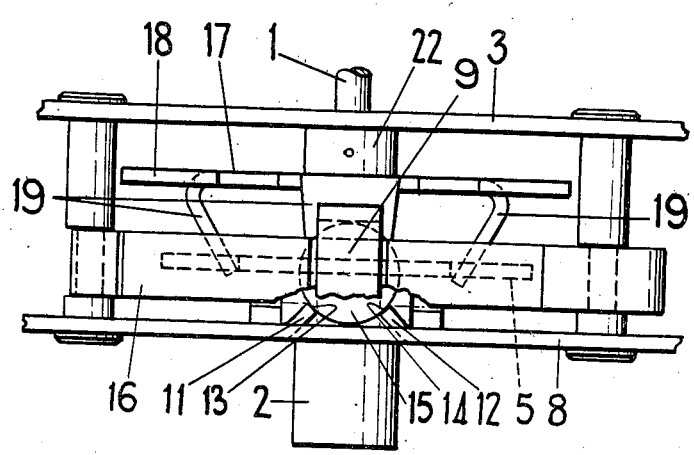
Figure 3 shows a plan view of the device in the direction of the arrow III in Figure 2.

A shaped member or ramp 23 (see in particular Figure 4) is provided on the opposite side of the driven shaft 2 to the ball 15. This ramp 23 is secured to the fixed plate 8 and projects towards the front panel 3. When the plate 17 is moved towards the plate 5 for the purpose of releasing the driven shaft 2, as previously described, part of the ramp 23 passes between two adjacent projections 18 of the plate 5. Upon the driving shaft 1 being turned for the purpose of causing the driven shaft 2 to rotate, one of these projections 18 engages with the edge 24 of the ramp 23 and urges the plate 17 away from the plate 5. By this time the ball 15 has been forced out of the guide, thereby releasing the plate 5, so that further rotation of the shaft 2 is possible even though one of the bentover projections 19 is no longer bearing against the ball 15. If the operator continues to turn the knob 4, without pressing it towards the panel 3, a position is reached in which the ball 15 is forced by the leaf spring 16 into the next indentation 6 of the plate 5 so as again to locate the plate 5 and the driven shaft 2.

We claim:

1. A device for transmitting rotary motion comprising a driving shaft, a driven shaft which is required to be positively located in one or more positions, means to mount the driving shaft coaxially with the driven shaft so as to permit relative longitudinal movement of the driving shaft, a first part which is coupled to the driven shaft to prevent rotation of that part relative to the driven shaft and which is shaped to have one or more indentations corresponding one to each of said positions, a pair of fixed parts, a ball, means to spring-bias the said ball so that when the driven shaft is located in any one of said positions the ball is urged along a guide which is defined by a pair of opposite sides of the appropriate indentation of the first part and by the pair of fixed parts and which guide is tapered to cause the ball to take up a position in which it makes four point contacts one with each of the opposite sides of the said pair thereof and with each of the said fixed parts, a second part, means to couple this second part to the driving shaft to prevent longitudinal movement of that part relative to the driving shaft so that upon longitudinal moving of the driving shaft relative to the driven shaft a surface of the second part bears against the said ball and moves it against the spring-bias thereby releasing the first part, and means providing mechanical coupling between the first and second parts at least when the said ball is moved against the spring-bias by the second part to release the first part and which allows at least some relative rotation of the two parts when the driven shaft is positively located.

2. A device according to claim 1 wherein the two shafts are co-linear.

3. A device according to claim 1 wherein the first part is rigidly secured to the driven shaft.

4. A device according to claim 1 wherein the first and second parts each comprise a plate, the plate that forms the second part having a plurality of portions bent over and in each of said positions in which the driven shaft is positively located one of these portions providing the said surface that is arranged to bear against the ball.

5. A device according to claim 4 wherein each of these portions extends through one of said indentations in the plate that forms the first part so as to provide the required coupling between the two parts.

6. A device according to claim 1 wherein the said two fixed parts provide two planner surfaces with which the said ball makes contact when the driven shaft is positively located.

7. A device according to claim 1 wherein the said two fixed parts are portions of a unitary body.

8. A device according to claim 7 wherein the two fixed parts are provided by two portions bent out from a plate.

9. A device for transmitting rotary motion comprising a driving shaft, a driven shaft which is required to be positively located in a plurality of positions, means to mount the driving shaft co-linearly with the driven shaft so as to permit relative longitudinal movement of the driving shaft, means to limit the longitudinal movement of the driving shaft relative to the driven shaft, a first plate which is shaped to have a plurality of indentations corresponding one to each of said positions, means rigidly to secure the first plate to the driven shaft so that the plate lies generally perpendicular to the shaft, a pair of fixed parts, a ball, means to spring-bias said ball so that when the driven shaft is located in any one of said positions the ball is urged towards the axis of rotation of the shafts along a guide which is defined by the pair of opposite sides of the appropriate indention of the first plate and by the pair of fixed parts and which guide is tapered to cause the ball to take up a position in which it makes four point contacts one with each of the opposite sides of the said pair thereof and with each of the said fixed parts, a second plate having a plurality of portions which are equal in number to the said number of positions and which are each bent over through an obtuse angle, and means rigidly to secure the second plate to the driving shaft so that the plate lies generally perpendicular to that shaft with each of the said portions projecting through one of the said indentations of the first plate in all positions of the driving shaft relative to the driven shaft so that, upon longitudinal movement of the driving shaft relative to the driven shaft when the driven shaft is positively located, one of the portions of the second plate bears against the said ball and moves it against the spring-bias thereby releasing the first plate and permitting the driven shaft to rotate when the driving shaft is rotated.

References Cited in the file of this patent
UNITED STATES PATENTS 2,447,718    Simpson               Aug. 24, 1948
2,633,213    Houplain              Mar. 31, 1953